United States Patent [19]
Audier et al.

[11] Patent Number: 5,998,777
[45] Date of Patent: Dec. 7, 1999

[54] CIRCUIT FOR THE READING OF LINEAR ARRAYS OF PHOTODETECTORS

[75] Inventors: Marcel Francis Audier, Paris; Véronique Besnard, Gif sur Yvette; Guy Rigaux, Seyssins, all of France

[73] Assignees: Thomson-CSF, Paris; Sofradir, Chatenay Malabry, both of France

[21] Appl. No.: 08/895,280

[22] Filed: Jul. 16, 1997

[30]     Foreign Application Priority Data

Jul. 16, 1996 [FR] France ..................................... 96 08855

[51] Int. Cl.$^6$ ....................................................... H04N 3/14
[52] U.S. Cl. ......................................... 250/208.1; 348/295
[58] Field of Search ............................ 250/208.1, 214 R; 348/294, 295, 308, 311

[56]               References Cited

U.S. PATENT DOCUMENTS

| | | |
|---|---|---|
| 4,900,943 | 2/1990 | Marshall et al. . |
| 5,268,822 | 12/1993 | Delalande et al. . |
| 5,668,375 | 9/1997 | Petrick et al. ......................... 250/208.1 |
| 5,812,190 | 9/1998 | Audier et al. ......................... 250/208.1 |

FOREIGN PATENT DOCUMENTS 0 660 600   6/1995   European Pat. Off. .

*Primary Examiner*—Edward P. Westin
*Assistant Examiner*—Kevin Pyo
*Attorney, Agent, or Firm*—Oblon, Spivak, McClelland, Maier & Neustadt, P.C.

[57]                ABSTRACT

The read circuit can be applied to optomechanical scanning imaging devices. The circuit is designed for the reading of batteries of photodetectors comprising a specified number N of detection channels, each constituted by $N_d$ sensors positioned in the scanning direction, such that each point of an image is successively analyzed by $N_d$ sensors of a channel. The circuit includes a current summation scale, associated with each detection channel, formed by a specified number M of current summation circuits and coupled to the detection channel by means of a voltage-current conversion device. Application to the thermal imaging devices.

4 Claims, 2 Drawing Sheets

CIRCUIT FOR THE READING OF LINEAR ARRAYS OF PHOTODETECTORS

BACKGROUND OF THE INVENTION

The present invention relates to a circuit for the reading of linear arrays of photodetectors. It can be applied especially to high-performance thermal imaging devices using optomechanical scanning of the image perpendicularly to a linear array of photodetectors.

In these imaging devices, the scanning is done by an appropriate optomechanical system comprising in particular a mobile mirror and an optical assembly for the formation and projection of an image of the observed scene on the detection linear array.

Conventionally, in the direction perpendicular to the scanning, the linear array comprises a number N of detection channels enabling the parallel reading of N instantaneous fields. In order to improve the sensitivity of the imaging devices, each detection channel comprises a determined number $N_d$ of "sensors" aligned in the scanning direction, such that each point or pixel of the image-taking field is analyzed successively by $N_d$ sensors. The improvement of the sensitivity is obtained by the recomputation, in phase, of the electrical signals delivered by each of the sensors of one and the same channel and then by the adding together of these signals. Since the noise is added quadratically, the addition of the signals given by the $N_d$ sensors enables the signal-to-noise ratio to be improved by the factor $\sqrt{N_d}$. This processing of the signals is known in specialized literature as "time delay and integration" or TDI.

In the known embodiments, with each detection element there is associated a circuit for the injection and integration of the photo-charges generated by the photosensitive cells proportionally to the illumination received. At the end of the integration period, the state of the integrator is read either by means of a shift register comprising as many lateral inputs as the detection channel or, in the CMOS technology structures, by a summation circuit comprising switched-capacitance operational amplifiers.

Since the number of information elements during processing, at a given point in time, is set by the number of detection channels "N", the number of sensors per channel $N_d$ and the ratio between the pitch $P_d$ of the sensors and the sampling pitch $P_e$ of the image in the scanning direction and since each of these information elements is assigned to a Time Delay and Integration (TDI) operator comprising $N \cdot N_d \cdot P_d / P_e$ summation devices, the dimensions of the linear arrays are soon limited firstly by the space requirement of the read circuit and secondly by the dissipated power. For example, if N=1000, $N_d$=10 and $P_d/P_c$=3, 30,000 TDI summation devices are needed.

Furthermore, the low frequency noise, the limited gain, the gain variations and offset variations of the operational amplifiers, combined with the fluctuations of the values of the summation capacities, lead to the superimposing, on the restituted video signal, of an additional noise that is difficult and costly to correct.

SUMMARY OF THE INVENTION

The aim of the invention is to overcome the above-mentioned drawbacks.

To this effect, an object of the invention is a circuit for the reading of linear arrays of photodetectors for optomechanical scanning imaging devices, the linear array comprising a specified number N of detection channels each consisting of $N_d$ sensors positioned in the scanning direction, such that each point of the image is analyzed successively by $N_d$ sensors of a channel, wherein said circuit comprises a current summation scale associated with each detection channel, consisting of a specified number M of current summation circuits and coupled to the detection channel by means of a voltage-current conversion device.

The chief advantage of the invention is that it enables the making of summation circuits whose performance characteristics depend neither on precise control of the geometrical aspects or electrical characteristics of the transistors implemented nor on precise, linear floating capacitances that are always difficult to obtain and costly in terms of silicon surface area.

BRIEF DESCRIPTION OF THE DRAWINGS

Other features and advantages of the invention shall appear from the following description made with reference to the appended diagrams, of which.

MORE DETAILED DESCRIPTION

Figure 1:
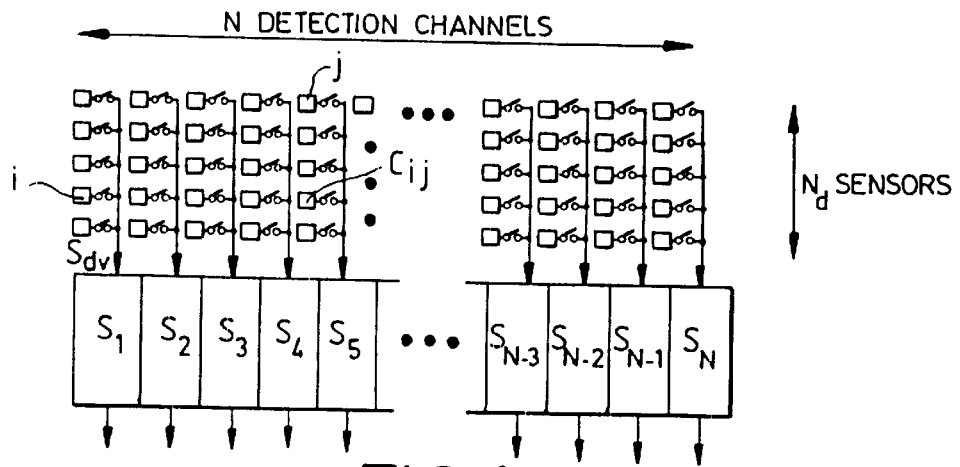
FIG. 1 shows an exemplary schematic view of detection channels consisting of linear arrays of photosensitive sensors coupled to a read circuit.
Figure 2:
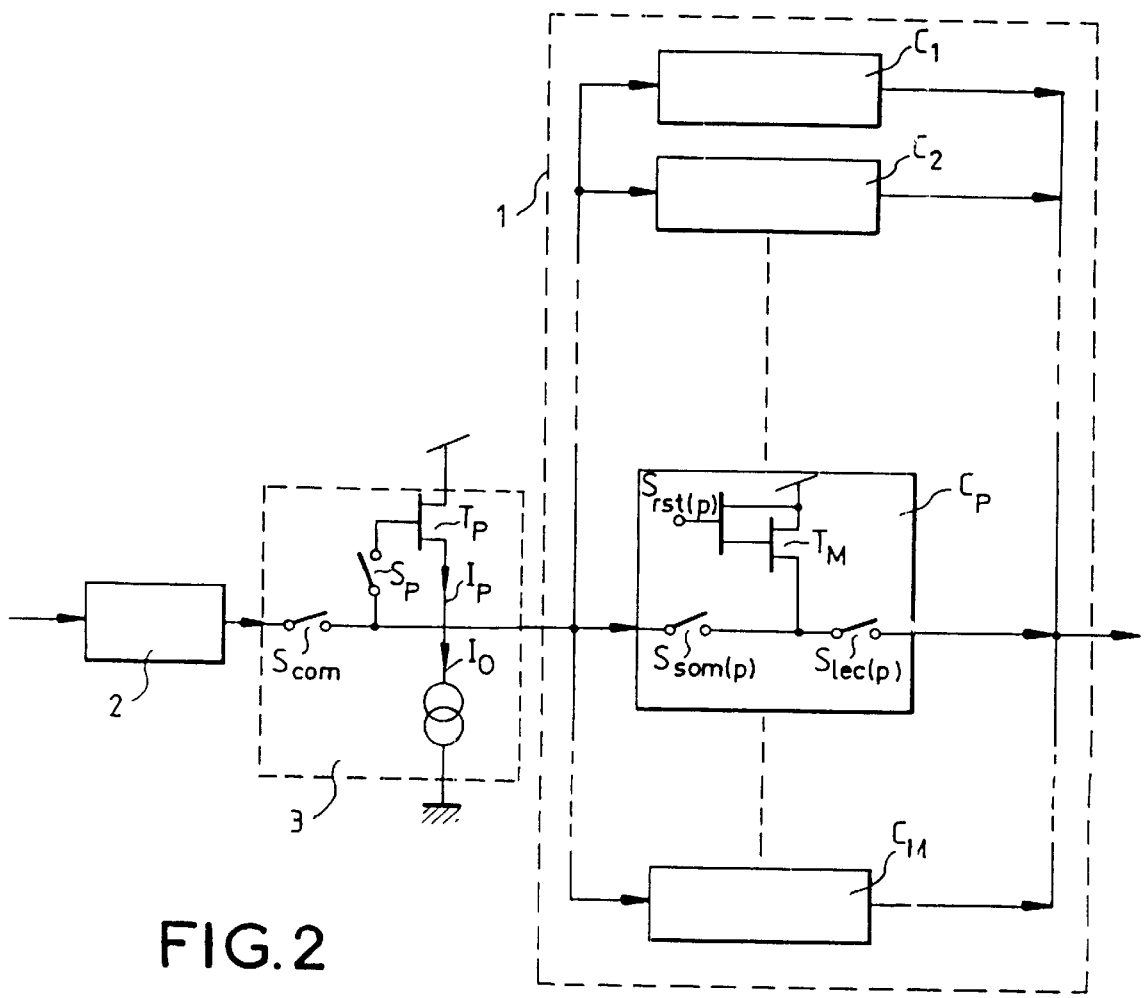
FIG. 2 shows an exemplary implementation of a circuit for the reading of linear arrays of photodetectors according to the invention.
Figure 3:
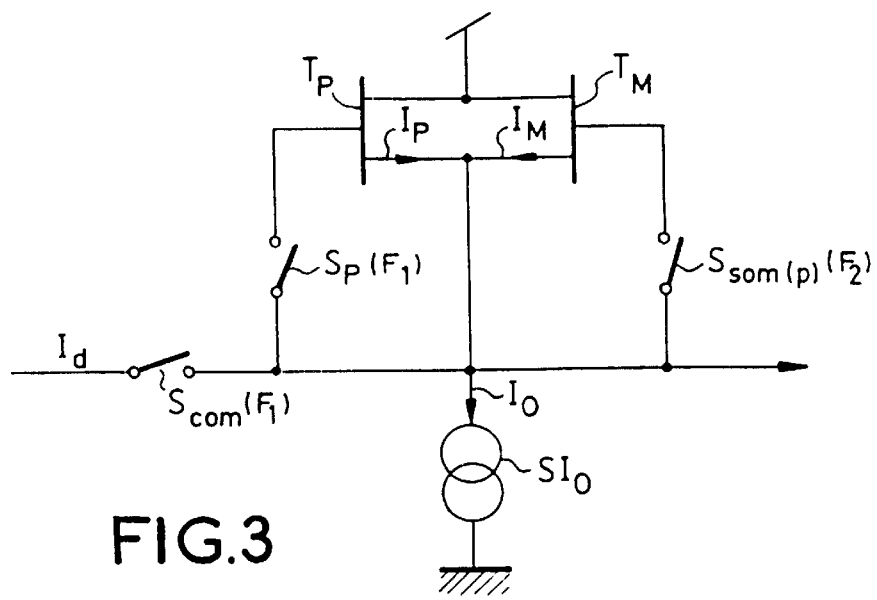
FIG. 3 shows an embodiment of a current summation device for the implementation of the circuit of FIG. 2.

The read circuit according to the invention that is shown in FIG. 1 has N summation devices $S_1$ to $S_N$ coupled to the respective outputs of N channels of a detection linear array each consisting of $N_d$ integrator sensors $C_{ij}$. Each of the sensors $C_{ij}$ is positioned at the intersection of a row i and a column j of the linear array in a matrix organization and is formed for example in a known way by a photodetector coupled to an operational amplifier wired as an integrator. Each column j thus forms a detection channel that is oriented in the image scanning direction. It has a specified number $N_d$ of integrator sensors respectively connected by means of switches $I_{ij}$ to one and the same summation device $S_j$, an exemplary embodiment of which is shown in FIG. 2. This embodiment comprises, shown respectively within boxes of dashes, a current summation scale 1 coupled by its input to a voltage/current conversion device 2 by means of a current amplifier stage 3. The current summation scale 1 consists of M summation cells $C_p$ p∈1 ... M, each cell being connected by means of a switch $S_{SOM(p)}$ to the output of the current amplifier stage 3 to form, with the current amplifier stage 3, a current integrator circuit organized according to the schematic diagram of FIG. 3 where the elements similar to those of FIG. 2 are shown with the same references. This circuit has two MOS transistors $T_p$ and $T_m$ working in the form of a current memory according to the principle recalled in Appendix 1. These transistors are parallel connected by their source and drain electrodes and are supplied by the same current source $SI_o$. Of the transistors $T_p$ and $T_m$, one transistor "$T_p$" forms the amplifier stage 3 while the other "$T_m$" forms a summation cell $C_p$. The gates of the transistors $T_p$ and $T_m$ are respectively connected to the current source $SI_o$ by means of a switch $S_{som(p)}$. A switch $S_{com}$ also connects the point common to the switch $S_p$ and the current source $Si_o$ to the output of the voltage/current conversion device 2. Thus made, each integrator circuit enables the obtaining of the sum of the current pulses transmitted by the voltage/current converter 2 during the analysis of the detection channel to which it is connected. This summation is obtained by carrying out successive operations, during the scanning of the detection channel, for the opening of the switches $S_p$ and $S_{com}$ followed by the closing of the switch $S_{som}$.

At the beginning of the cycle, when the switches $S_{com}$ and $S_p$ are closed and the switch $S_{som(p)}$ is open, the current $I_{p1}$ that flows in the transistor $T_p$ is given by the relationship:

$$I_{p1} = I_o - (I_{Mo} + I_{d1}) \tag{1}$$

in which $I_o$ designates the current given by the current source $SI_o$, $I_{Mo}$ is the current flowing through the transistor $T_m$ and $I_{d1}$ is the current given by the voltage/current conversion device 2.

After a first cycle, the current $I_{M1}$ that flows through the transistor $T_m$ becomes:

$$I_{M1} = I_o - I_{p1} = I_{Mo} + I_{d1} \tag{2}$$

and at the nth cycle this current becomes:

$$I_{Mn} = I_{Mo} + \sum_{k=1}^{n} I_{dk}. \tag{3}$$

By this principle, the transistor $T_m$ acquires the capacity to let through a current whose amplitude corresponds to the sum of the current samples $I_{d(k)}$ presented to the input of the integrator.

A sequencer logic circuit, not shown, enables the control of a multiplexer formed by the matrix of switches "$S_{som(p)}$" in order to configure the summation scale so that the transfer of the $N_d$ current pulses corresponding to the analysis of one and the same pixel (P) of the image is done always in one and the same summation cell $C_p$ that is dedicated to it. Thus, after one and the same pixel "p" of the image-taking field has been analyzed by the $N_d$ sensors of the channel, the memory cell dedicated to the analysis of this pixel acquires, in the corresponding current integrator circuit, a throughput capacity equal to:

$$I_{Mp,n} = I_{Mp,o} + \sum_{k=1}^{N_d} P_{p,d(k)} \tag{4}$$

these contents are extracted by the closing of the switch $S_{lec(p)}$ controlled by the sequencer circuit which is not shown.

When these contents are extracted, the current integrator circuit forming each summation cell $C_p$ is reset under the control of the sequencer circuit in forming the switch "Srst(p)" on a reference voltage whose value sets that of the initial current "$I_{M(i,o)}$".

Figure 4:
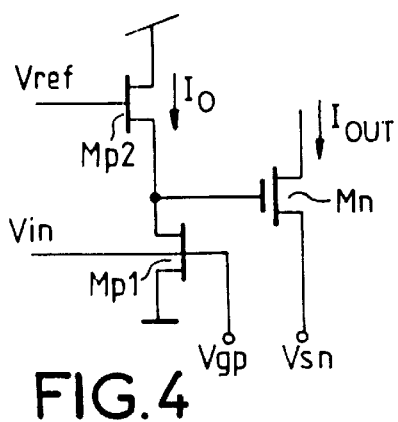
FIG. 4 shows an embodiment of a voltage/current conversion circuit for the implementation of the circuit of FIG. 2.

To obtain the voltage/current conversion required to couple the integration circuits of a detection channel with a summation scale 1, the known circuits appear to be ill-suited to the requirement of an array of photodetectors formed by hundreds of channels. To overcome this drawback, the circuit shown in FIG. 4 gives a schematic view of a transconductor compatible with high integration density, dissipating little power and showing a great dynamic range of linear operation. It is formed by two MOSFET transistors $M_{p1}$, and $M_{p2}$ mounted as a current mirror coupled with an output MOSFET transistor $M_n$. The p type transistor $M_{p1}$ is crossed by a constant current $I_o$ controlled by the secondary arm of a current mirror symbolized by the transistor $M_{p2}$. The potential of the substrate of the transistor $M_{p1}$ is dictated by the voltage to be converted "$V_{in}$" coming from the corresponding etection channel. The current $I_{DS}$ flowing through the transistor $M_{p1}'$ is related to the potential of its source, at constant drain potential, by the relationship:

$$I_{DS} = \frac{\beta}{2}(V_G - V_S - V_{Th})^2$$

where $V_{Th}$ is a threshold voltage that is expressed as a function of the source-substrate potential $V_{BS}$ by:

$$V_{Th} = V_{Th_0 V_{BS}=o} + \gamma_p\left(\sqrt{\phi + V_{BS}} + \sqrt{\phi}\right)$$

$\gamma_p$ being a substrate effect coefficient and $\phi$ being the potential of the material.

In applying a voltage $$V_{GS} = \sqrt{2\frac{I_o}{\beta_p}}$$

to the gate of the transistor $M_{p1}$ and in passing on the source potential obtained at the gate of the N type transistor $M_n$, the connection of the source to a voltage that is slightly different from the reference potential makes it possible to obtain a linear relationship between the current flowing through the transistor $M_n$ and the voltage applied to the substrate of the transistor $M_{p1}$.

The corresponding current $I_{DS_N}$ is given by the relationship:

$$I_{DS_N} = C_1(V_{in} + C_2)$$

with $$C_{1+} = \frac{\gamma^2 \beta_n}{2} \quad \text{and} \quad C_2 = V_{Thp} + \left(\frac{\gamma_p}{2} + \sqrt{\phi}\right)^2$$

Naturally, the implementation of the invention is not limited to the exemplary embodiment that has just been described.

Figure 5:
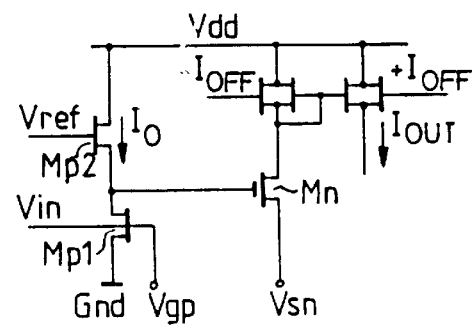
FIGS. 5 and 6 show improvements that can be made to the circuits of FIGS. 3 and 4.
Figure 6:
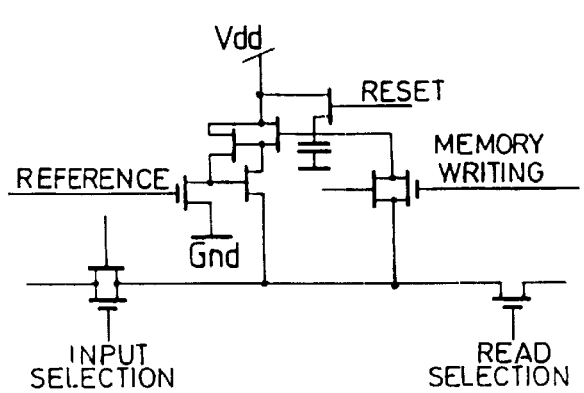

An increase in the performance characteristics of the circuit of FIG. 4 may be obtained as shown in FIG. 5 where the elements similar to those of FIG. 4 are shown with the same references. As can be seen in the figure, this increase can be obtained by the addition of MOSFET transistors $M_{p3}$ and $M_{p4}$, used for the addition or deduction, to or from the current given by the circuit, of an offset current, Ioff and –Ioff respectively. Again, to minimize the effects caused by the different noise sources and the variation of the characteristics of the integrator circuits, it is possible to use current memories preferably designed as suggested in FIG. 6 by means of "superMOS" type active cascade assemblies. These assemblies have the advantage of reducing, to negligible levels, the effects of modulation of the effective length of the MOS channel as a function of the variations in potential. As shown in FIG. 5, the switches $S_{com}$ and $S^{som}$ may firstly be compensated for to cancel out the effects of the coupling between the control signals and the gate of the memory transistor and secondly, be made with the transistors of the smallest size in order to reduce the effect of the moving load. This effect may also be marginalized for example by increasing the gate capacitance of the memory transistor. This also makes it possible to reduce the sampling noise, by obtaining a slow closure of the switches.

APPENDIX 1

Figure 7:
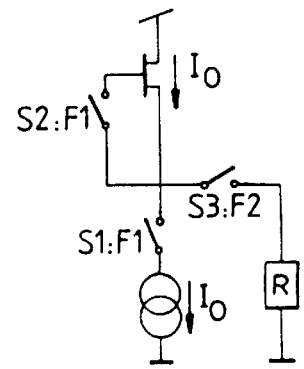
FIG. 7 shows a schematic diagram to explain the working of a current memory.

FIG. 7 recalls the principle of a current memory. This memory consists of a MOSFET transistor $T_m$ supplied by a constant current source $I_o$, and three switches $S_1$, $S_2$ and $S_3$. When the current $I_o$ is sufficient, such that $$I_o \gg 2\left(\beta\left(\frac{KT}{q}\right)\right)^2,$$

the closing of the switches $S_1$ and $S_2$, causes the transistor $T_m$ to work in strong reversal mode and, simultaneously, sets up a potential $V_G$ at the gate of the transistor such that:

$$V_G = V_{Thp} + \sqrt{\frac{2I_o}{\beta}}$$

In the above relationships $\beta$ is a gain factor that depends on the gate width W of the MOSFET transistor, $V_{Thp}$ represents the threshold voltage of the transistor and $KT/q$ is the thermodynamic potential which is typically 26 mV for T=300° K. The opening of the switches $S_1$ and $S_2$ and then the closing of the switch $S_3$ enables the transistor $T_M$ to let through a current $I_R$ on the load R such that:

$$I_R = \frac{\beta}{2}(V_g - V_{Thp})^2$$

giving $I_R = I_o$

What is claimed is:

1. A circuit for reading of linear arrays of photodetectors for optomechanical scanning imaging devices, the linear array comprising a specified number N of detection channels each of said channels consisting of $N_d$ sensors positioned in a scanning direction, such that each point of the image is analyzed successively by said $N_d$ sensors of a channel, wherein said circuit for reading of linear arrays of photodetectors comprises N current summation devices, each one of said N current summation devices being associated with a respective one of said detection channels, and wherein each of said N summation devices includes a specified number M of current summation circuits wherein each of said M current summation circuits is coupled to a respective one of said N detection channels by an associated voltage-current conversion device.

2. A circuit according to claim 1, wherein each current summation circuit of a detection channel comprises a first MOSFET transistor and a second MOSFET transistor parallel-connected by their source and drain electrodes and supplied by one and the same constant current source to work as a current memory.

3. A circuit according to either of the claims 1 or 2, wherein the voltage-current conversion device includes a first MOSFET transistor with a first type of conduction, crossed by a constant current $I_o$, the substrate of this transistor being biased by the voltage "Vin" given by the detection channel and a second MOSFET transistor with conductivity opposite that of the first transistor, connected by its gate to the drain electrode of the first transistor and coupled by its drain electrode to the input of one of the current summation scale devices.

4. A circuit according to claim 2, wherein the summation circuits are coupled to the voltage-current conversion device by means of a multiplexing circuit "$S_{som(p)}$" to enable current pulses, delivered by the $N_d$ sensors associated with one of said channels and corresponding to the analysis of one and the same point of an image, to be summated in one and the same current summation circuit.

* * * * *